United States Patent Office 3,666,459
Patented May 30, 1972

3,666,459
ELECTROPHOTOGRAPHIC PHOTOCONDUCTIVE COMPOSITION CONTAINING A STYRENE TERPOLYMER BINDER AND A CHARGE-ENHANCING ADDITIVE
Felix P. Liberti, Totowa Borough, and Stanley Field, Piscataway, N.J., assignors to National Starch and Chemical Corporation, New York, N.Y.
No Drawing. Filed Oct. 8, 1970, Ser. No. 79,257
Int. Cl. G03g 5/08
U.S. Cl. 96—1.8
10 Claims

ABSTRACT OF THE DISCLOSURE

Improved electrophotoconductive coating compositions for application to solid substrates which are to be utilized in electrophotographic operations are described; said coating compositions employing certain styrene terpolymers and a chlorinated biphenyl charge-enhancing additive.

---

This invention relates to new and improved photoconductive coating compositions. More particularly, the invention relates to photoconductive coating compositions employing certain random styrene terpolymers and a charge-enhancing additive as binders for the photoconductive pigment and to the improved photoconductive coatings obtained therefrom.

In the known electrophotographic processes, a solid substrate which has been coated with a photoconductive surface is electrostatically charged in the absence of light. The charged surface is then exposed to a light source, such as an image reflected from a printed surface or transmitted through a transparency, which serves to discharge the exposed area while having no effect upon the charge on the unexposed areas which is retained in the form of an electrostatic image. The surface areas are then contacted with an electrostatically charged marking powder or dispersion which clings to the charged areas but does not adhere to the uncharged, i.e. exposed, areas. The visible image which is thus formed may then be transferred to another surface resulting in a positive or negative print, or, if desired, it may be fused in order to fix the image directly to the solid substrate itself.

It is evident that the proper selection of a photoconductive system is essential for a successful electrophotographic operation. Among the properties that must be exhibited by such photoconductive materials are included: the ability to accept an electrostatic charge; the ability to hold the charge for a period of time in the absence of light without exhibiting a rapid rate of charge decay; the ability to provide the fixed or developed sheets with excellent print density; the ability to provide an efficient dispersing medium for the pigment particles; inertness of the binder toward the pigment which is being utilized; and, the ability to be readily coated onto a solid substrate.

A frequently utilized photoconductive system of the prior art comprises the combination of a photoconductive zinc oxide pigment and a polyvinyl acetate binder. This system, however, does not exhibit the aforementioned properties to an optimum level.

It is the object of this invention to provide a photoconductive system which has the ability to accept an electrostatic charge which is greater than is ordinarily obtained with related prior art binders and to retain the electrostatic charge for a period of time which is sufficient to permit visible development and fixation of an electrostatically formed image and which is, therefore, readily applicable for use in electrophotographic operations. It is a further object to prepare base plates for use in electrophotographic operations by coating the latter photoconductive system onto applicable solid substrates. Various other objects and advantages of this invention will be apparent from the following description thereof.

Copending application Ser. No. 853,959 filed on Aug. 28, 1969 now U.S. Pat. 3,620,729, discloses photoconductive coatings comprising a photoconductive pigment bonded with a binding agent based on certain random styrene terpolymers. The novel binders used therein comprise specified styrene-containing terpolymers which are used in the form of lacquers, i.e. as organic solvent solutions.

We have now found that the charge acceptance (and hence the image density of the electrophotographic copy sheet) is greatly enhanced by the use of certain charge-enhancing additives employed in combination with the styrene polymers described in the aforementioned application. Thus, we have found that solid substrates which have been coated with compositions prepared with random styrene terpolymers as well as a charge-enhancing additive will accept a greater charge as compared to similar compositions which do not contain the charge-enhancing additive. The coated substrate will, of course, hold the electrostatic charge in the absence of light, and upon being exposed to light will immediately release the charge from the exposed areas but will retain the charge on the unexposed areas with a high degree of efficiency and for a period of time sufficient to permit visible development of the electrostatic image formed by the unexposed areas. Furthermore, these photoconductive systems are readily coated onto a variety of solid substrates and provide the resulting printed sheet with excellent print density, i.e. with excellent definition of the visible image.

The charge-enhancing additives useful herein are comprised of chlorinated biphenyl compounds and will ordinarily contain from about 20 to 68%, by weight, of chlorine. The compounds or mixtures thereof may range from colorless liquids to pale yellow, viscous oils to opaque solids. In general, it is more desirable to use the products in preparing the coating compositions in the form of liquids or viscous oils. A variety of these compounds is available commercially under the tradename "Aroclor" and sold by Monsanto Company. Approximately from 0.5 to 25 parts, and preferably 2.5 to 15 parts, by weight, of the charge enhancing additive should be present in the coating compositions for each 100 parts, by weight, of the random styrene terpolymer resin solids.

The composition of the styrene terpolymers useful herein comprises (A) at least one styrene monomer selected from the group consisting of styrene, alpha-methyl styrene and chlorostyrene; (B) at least one monomer selected from the group consisting of the $C_1$–$C_{18}$ alkyl, the $C_3$–$C_6$ cycloalkyl and the $C_1$–$C_{12}$ aralkyl esters of an ethylenically unsaturated dicarboxylic acid, wherein the specified carbon atom range of the latter aralkyl esters refers to the carbon atom content of the alkyl moiety of the aralkyl ester molecule; and, (C) at least one monomer selected from the group consisting of ethylenically unsaturated monocarboxylic acids; anhydrides of ethylenically unsaturated dicarboxylic acids; and, the $C_1$–$C_8$ monoalkyl esters of ethylenically unsaturated dicarboxylic acids. The molar ratio of the above described styrene terpolymers may be in the range of from about 1.0:0.95:0.05 to 1.0:0.05:0.50; the latter molar ratios being stated in the sequence A:B:C wherein the latter letters are those used to designate the above given monomer groups.

Exemplary of the monomers of Group B, hereinabove, are dimethyl fumarate, diethyl fumarate, dibutyl fumarate, dioctyl fumarate, distrearyl fumarate, dicyclohexyl fumarate, diisonoyl fumarate, dibenzyl fumarate, dimethyl maleate, diethyl maleate, dibutyl maleate, dioctyl maleate, dicyclohexyl maleate, dimethyl citraconate and dimethyl itaconate.

Monomers illustrative of the monomers of the group C are acrylic acid, methacrylic acid, crotonic acid, itaconic acid, citraconic acid, maleic anhydride, monomethyl maleate, monoethyl maleate, monobutyl maleate, monooctyl maleate, monomethyl fumarate, monoethyl fumarate, monobutyl fumarate, monooctyl fumarate, monomethyl citraconate and monomethyl itaconate.

Preferred random styrene terpolymers for use as binders in the photoconductive coating systems of this invention include a 1.0:0.45:0.25 styrene:dioctyl fumarate:monoethyl maleate terpolymer and a 0.65:0.375; 0.125 styrene:dibutyl fumarate:monobutyl maleate terpolymer and a 1.30:0.86:0.16 styrene:dibutyl fumarate; acrylic acid terpolymer; the latter proportions being given on a molar ratio basis.

All of the random styrene terpolymers used in the binder compositions described herein may be prepared by means of free radical initiated polymerization procedures or by other polymerization procedures well known to those skilled in the art. However, they are most conveniently prepared by means of free radical initiated solution polymerization techniques and they may be then used in the form of the organic solvent solutions in which they were originally prepared. Alternatively, they may be prepared as 100% resin solids material, as by means of a bulk or pearl polymerization procedure, and subsequently dissolved in organic solvents prior to their use as binders in our photoconductive coating compositions. Organic solvents which may be employed for the solution polymerization of these terpolymers as well as for their ultimate use in formulating our photoconductive coating compositions include benzene, toluene, xylene, cyclohexane, ethyl acetate, isopropyl acetate, methyl ethyl ketone and methyl isobutyl ketone as well as mixtures of any of the latter solvents. Typical organic solvent solutions of these terpolymers, as used in preparing our photoconductive coating compositions, should have a resin solids content of up to about 70%, by weight.

It is to be understood that although photoconductive zinc oxide will ordinarily be utilized as the photoconductive pigment component of our novel compositions, it may, however, be replaced with various equivalents therefor, such for example, as titanium dioxide, selenium oxide, zinc sulfide, and the like. Moreover, a mixture of more than one photoconductive pigment may likewise be used.

The actual preparation of the novel photoconductive coating systems of this invention may be accomplished merely by admixing and dispersing the photoconductive pigment in an organic solvent solution of the selected terpolymer, which has been preblended with the required charge-enhancing additive, and thereafter finely grinding the resulting dispersion in any suitable equipment, such as a porcelain ball mill, Morehouse mill, Kady mill, or sand mill, to a pigment particle size of from about 4 to 6 units on the Hegman scale. If desired, instead of being preblended with the terpolymer lacquer solution, the charge-enhancing additive conveniently may be post-added to the composition at any point during its preparation.

Approximately from about 2 to 12 parts, by weight, of zinc oxide solids should be present in the mixture for each part, by weight, of the random styrene terpolymer resin solids. We have found that the total solids content, i.e. the combined weight of the pigment solids, the charge enhancing additive and the styrene terpolymer solids, of our photoconductive coating compositions may vary from about 40 to 65%, by weight. Appropriate dilution, when necessary, can be made using any one or more of the organic solvents described hereinabove.

The preparation is generally completed by incorporating a sensitizer dye or dye mixture into the coating composition in a concentration ranging from about 0.02 to 0.50%, based on the weight of the zinc oxide. Applicable sensitizers include, for example, disodium fluorescein, Rose Bengal, bromphenol blue, methylene blue, erichrome black, Eosin Y and Acridine Orange. The addition of the latter sensiziters may, however, be obviated if the resulting photoconductive systems are to be utilized in a procedure whereby the light or energy source is itself capable of causing a conductive response in the zinc oxide photoconductive pigment.

Optional additives may be incorporated into these novel photoconductive systems in order to modify certain properties thereof. Among such additives are included: plasticizers such as dialkyl phthalate; optical brighteners such as titanium dioxide; silicones; and, modifying resins such as alkyd resins.

Our novel systems may be coated onto a wide variety of solid substrates such, for example, as paper, paperboard, fabrics made from natural and synthetic fibers, metallic coated paper, metallic foils, and synthetic resin-based films such as polyethylene terephthalate, polyethylene, polypropylene, polyvinyl chloride and cellulose acetate, the latter resin-based films having previously been rendered conductive or semi-conductive. The actual application of these photoconductive systems to the selected substrate may be accomplished by the use of any technique which is capable of depositiing a continuous film on the surface thereof. Thus, among the various methods of application which may be utilized, one may list wire wound and grooved rod applicators, as well as air knife, trailing blade, gravure, reverse and direct roll coaters. Typical coating weights may range from about 8 to 30 pounds per 3000 square feet of substrate.

Following their application, the photoconductive coating systems are dried by any convenient means, as for example, by the use of forced air oven drying, infra-red or radiant heat drying. Here again, such drying methods are well known and the practitioner may employ the drying means best suited to this particular needs in light of the equipment which is available.

In order to demonstrate the excellent photoconductive properties exhibited by the coating systems of this invention, the tests described hereinbelow may be used. In each instance, these tests were conducted in an environment wherein the relative humidity was at a level of 50%.

Charge acceptance. — The selected photoconductive coating system is applied onto a paper substrate in a coating weight of 18 pounds per 3000 square feet of paper and then dried. Thereafter, the coated paper is conditioned, in the absence of light, for a period of 24 hours whereupon it is exposed, while still in the dark, to an electrostatic charging unit for a period of 7 seconds. The surface charge which is thus imparted to the coated paper is then measured by means of an electrostatic probe.

Dark decay rate.—Continuing the procedure of the "Charge Acceptance" test, immediately after removing the charging unit and measuring the deposited surface charge, the electrostatic probe is utilized to measure the rate at which the charge dissipates from the surface of the coated paper by measuring the surface charge for a period of 10 seconds. Needless to say, photoconductive systems which exhibit a low dark decay rate, i.e. in the range of about 2 to 10 volts/second, are preferred for use in electrophotographic operations.

The following examples will more fully illustrate the embodiment of this invention. In these examples all parts given are by weight unless otherwise noted.

EXAMPLE I

This example illustrates the preparation of a typical random styrene terpolymer suitable for use as a binder in the photoconductive coating compositions of this invention.

A vessel equipped with means for mechanical agitation, thermometer, nitrogen sparger, addition funnel and condenser was charged with 208 parts of styrene, 306 parts of dioctyl fumarate, 72 parts of monoethyl maleate, 100 parts of toluene and 5.9 parts of benzoyl peroxide acting as a catalyst. Under agitation, the mixture was slowly heated to 95° C. over a 1 hour period and thereafter allowed to reflux at 90–96° C. for an additional 1 hour period. Thereafter, a total of 11.8 parts of benzoyl peroxide which had been dissolved in 150 parts of toluene was added in 4 equal portions at 1 hour intervals whereupon the reaction was allowed to proceed for 2 additional hours while maintaining the temperature within the specified range of 90–96° C. The resulting terpolymer was obtained at a conversion rate of 97% and displayed an intrinsic viscosity of 0.124 in toluene at 30° C.

EXAMPLE II

This example illustrates the preparation of a typical photoconductive coating system of this invention as well as the excellent properties resulting from the use thereof when coated on a solid substrate.

Thus, 9.5 parts of a toluene solution containing 50%, by weight, of a molar ratio basis 1.0:0.45:0.25 styrene: dioctyl fumarate: monoethyl maleate random terpolymer, prepared as described in Example I, hereinabove, was admixed with 50.3 parts of toluene which had been preblended with 0.25 parts of a chlorinated biphenyl compound containing about 52%, by weight, of chlorine. To this mixture was added 40.0 parts of a finely divided, photoconductive zinc oxide. The resulting suspension was subjected to grinding in a porcelain ball mill for a period of about 3 hours so as to reduce the particle size of zinc oxide to within the range of from 4.5 to 5.5 on the Hegman scale. Thereafter, 0.8 part, by weight, of a dye sensitizer mixture comprising 1.0%, by weight, of disodium fluorescein, 1.0%, by weight, of bromphenol blue and 1.0%, by weight, or erichrome black dissolved in methanol were intimately dispersed in the composition.

The resulting photoconductive coating composition, which had a total solids content of 45%, by weight, was then subjected to the "Charge Acceptance" and "Dark Decay Rate" tests, as described hereinabove, wherein it exhibited a charge acceptance of 450 volts and a dark decay rate of 10 volts/second.

In a repetition of the procedure just described, another photoconductive coating composition was prepared in similar fashion with the sole exception of omitting the addition of the chlorinated biphenyl compound, i.e. the charge-enhancing additive. The resultant coating was thereafter subjected to the described "Charge Acceptance" and "Dark Decay Rate" tests wherein it exhibited a charge acceptance value of only 380 volts and a dark decay rate of 10 volts/second.

These results clearly illustrate the capability of a photoconductive system containing the charge-enhancing additive of accepting a substantially greater surface charge—as compared to an identical system which does not contain the additive—for a period of time sufficient to fix an image created thereon, as indicated by its charge acceptance value and dark decay rate.

EXAMPLE III

This example illustrates the preparation of additional photoconductive coatings of this invention as well as their evaluation with respect to their charge acceptance and dark decay rate.

The following styrene terpolymers were prepared by means of the solu-polymerization procedure described in Example I, hereinabove.

| Terpolymer | Composition of terpolymer |
|---|---|
| A | Styrene:dibutyl fumarate:monobutyl maleate (0.65:0.375:0.125). |
| B | Styrene:dibutyl fumarate:acrylic acid (1.30:0.88:0.16). |

Each of the resulting random styrene terpolymers was utilized in two photoconductive coating compositions (with and without the charge-enhancing additive), respectively, containing ingredients listed in Table I, which ingredients were admixed and subjected to grinding in a porcelain ball mill for a period of approximately 3 hours. Each of the terpolymers was utilized in the form of 50%, by weight, resin solids solution in toluene.

TABLE I

| Ingredient | Formulation (parts) | | | |
|---|---|---|---|---|
| | #1 | #2 | #3 | #4 |
| Terpolymer A | 9.0 | 10.0 | | |
| Terpolymer B | | | 9.4 | 10.0 |
| Chlorinated biphenyl (48% chlorine) | 0.5 | | | |
| Chlorinated biphenyl (42% chlorine) | | | 0.8 | |
| Photoconductive zinc oxide | 40.0 | 40.0 | 40.0 | 40.0 |
| Toluene | 50.5 | 50.0 | 50.0 | 50.0 |
| Total solids content of system | ¹45 | ¹45 | ¹45 | ¹45 |

¹ Percent by weight.

Thereafter, 0.8 part of a sensitizer mix containing 1%, by weight, of disodium fluorescein, 1.0%, by weight, of bromphenol blue and 1%, by weight, of erichrome black dissolved in methanol were intimately dispersed in the composition.

Each of the resulting photoconductive coating compositions was then subjected to the described "Change Acceptance" and "Dark Decay Rate" tests. The results of these tests are summarized in Table II.

TABLE II

| | Charge acceptance, v. | Dark decay rate, v./sec. |
|---|---|---|
| Formulation: | | |
| #1 | 430 | 5 |
| #2 | 350 | 6 |
| #3 | 500 | 10 |
| #4 | 310 | 10 |

The summarized results clearly illustrate the enhanced charge acceptance obtained with the use of the described charge-enhancing additive. Thus, Formulation #1, which contains a chlorinated biphenyl, shows an approximately 22% increase in charge acceptance as compared to Formulation #2, an identical formulation which, however, does not contain any chlorinated biphenyl. Likewise, Formulation #3, which contains a chlorinated biphenyl, shows an approximately 60% increase in charge acceptance as compared to Formulation #4, an identical formulation which does not contain any chlorinated biphenyl.

EXAMPLE IV

In a repetition of the procedure described in Example II hereinabove, two additional photoconductive coating compositions were prepared in similar fashion utilizing a styrene:dibutyl fumarate monobutyl maleate (0.65:0.375: 0.125) terpolymer. One of the compositions was prepared to contain 2.5% of chlorinated biphenyl (containing 21% chlorine, by weight) based on the weight of the styrene terpolymer solids, while the other composition did not contain any chlorinated biphenyl. Each of the resulting compositions was then subjected to the described "Charge Acceptance" and "Dark Decay Rate" tests, and the results of these tests are summarized in Table III.

TABLE III

| | Charge acceptance, v. | Dark decay rate, v./sec. |
|---|---|---|
| Composition with chlorinated biphenyl | 390 | 10 |
| Composition without chlorinated biphenyl | 350 | 10 |

The above results again demonstrate the significantly enhanced charge acceptance which is obtained with the use of a chlorinated biphenyl in a concentration of only 2.5%, based on the weight of the styrene terpolymer solids.

Summarizing, it is seen that this invention provides improved electrophotoconductive coating compositions for application to solid substrates. Variations may be made in procedures, proportions and materials without departing from the scope of this invention.

We claim:

1. A photoconductive coating composition which comprises a blend of (1) a finely divided inorganic photoconductive pigment; (2) a chlorinated biphenyl compound containing 20% to 68% by weight of chlorine; and (3) a binder therefor comprising an organic solvent solution of a random styrene terpolymer containing moieties derived from:

(A) at least one styrene monomer selected from the group consisting of styrene, alpha-methyl styrene and chlorostyrene;

(B) at least one monomer selected from the group consisting of the $C_1$–$C_{18}$ alkyl, the $C_3$–$C_6$ cycloalkyl, and the $C_1$–$C_{12}$ aralkyl esters of an ethylenically unsaturated dicarboxylic acid, wherein the stated carbon atom range for said aralkyl esters refers to the carbon atom content of the alkyl moiety thereof; and, (C) at least one monomer selected from the group consisting of the ethylenically unsaturated monocarboxylic acids; the anhydrides of ethylenically unsaturated dicarboxylic acids; and, the $C_1$–$C_8$ monoalkyl esters of ethylenically unsaturated dicarboxylic acids; the molar ratio within said styrene terpolymer being in the range of from about 1.0:0.95:0.05 to 1.0:0.05:0.5 wherein the ratios are in the order (A):(B):(C); said chlorinated biphenyl compound comprising 0.5 to 25 parts by weight per 100 parts of terpolymer.

2. The coating composition of claim 1, wherein the ratio of pigment solids to binder solids ranges from about 2:1 to 12:1, by weight.

3. The coating composition of claim 1, wherein there is also present from about 0.02 to 0.5% of at least one sensitizer dye as based on the weight of the photoconductive pigment solids therein.

4. The coating composition of claim 1, wherein said photoconductive pigment is selected from the group consisting of zinc oxide, titanium dioxide, selenium oxide and zinc sulfide.

5. The coating composition of claim 1, wherein the said random styrene terpolymer contains moieties derived from styrene, dibutyl fumarate and monobutyl maelate.

6. An assembly suitable for use in electrophotographic operations, said assembly comprising a solid substrate coated on at least one surface thereof with a photoconductive coating composition comprising a finely divided inorganic photoconductive pigment whose particles are bound to said substrate and to one another by means of the dried consolidated residue of an organic solvent solution of a chlorinated biphenyl compound containing 20% to 68% by weight of chlorine and random styrene terpolymer containing moieties derived from:

(A) at least one styrene monomer selected from the group consisting of styrene, alpha-methyl styrene and chlorostyrene;

(B) at least one monomer selected from the group consisting of the $C_1$–$C_{18}$ alkyl, the $C_3$–$C_6$ cycloalkyl, and the $C_1$–$C_{12}$ aralkyl esters of an ethylenically unsaturated dicarboxylic acid, wherein the stated carbon atom range for said aralkyl esters refers to the carbon atoms content of the alkyl moiety thereof; and (C) at least one monomer selected from the group consisting of the ethylenically unsaturated monocarboxylic acids; the anhydrides of ethylenically unsaturated dicarboxylic acids; and, the $C_1$–$C_8$ monoalkyl esters of ethylenically unsaturated dicarboxylic acids; the molar ratio within said styrene terpolymer being in the range of from about 1.0:0.95:0.05 to 1.0:0.05:0.5 wherein the ratios are in the order (A):(B):(C); said chlorinated biphenyl compound comprising 0.5 to 25 parts by weight per 100 parts of terpolymer.

7. The assembly of claim 6, wherein the chlorinated biphenyl compound is present in a concentration of from about 0.5 to 25 parts, by weight, per 100 parts, by weight, of the random styrene terpolymer solids, and the ratio of pigment solids to binder solids ranges from about 2:1 to 12:1, by weight.

8. The assembly of claim 6, wherein there is present from about 0.02 to 0.5% of at least one sensitizer dye as based on the weight of the photoconductive pigment solids therein.

9. The assembly of claim 6, wherein said photoconductive pigment is selected from the group consisting of zinc oxide, titanium dioxide, selenium oxide and zinc sulfide.

10. The assembly of claim 6, wherein said random styrene terpolymer contains moieties derived from styrene, dibutyl fumarate and monobutyl maleate.

References Cited

UNITED STATES PATENTS

| | | | |
|---|---|---|---|
| 3,469,977 | 9/1969 | Savage | 96—1.5 |
| 3,486,889 | 12/1969 | Bobalek et al. | 96—1.5 X |
| 3,307,942 | 3/1967 | Cole | 96—1.5 X |
| 2,920,256 | 1/1960 | Lewis | 8—116.3 X |
| 3,404,994 | 10/1968 | Gulko | 117—1.7 |

FOREIGN PATENTS

| | | | |
|---|---|---|---|
| 874,981 | 8/1961 | Great Britain | 96—1.5 |
| 1,047,512 | 11/1966 | Great Britain | 96—1.5 |

OTHER REFERENCES

Chemical Abstracts, vol. 60, p. 12747c.

GEORGE F. LESMES, Primary Examiner

J. R. MILLER, Assistant Examiner

U.S. Cl. X.R.

96—1 PC, 1.5; 252—501